United States Patent [19]

Tanaka

[11] Patent Number: 4,901,311
[45] Date of Patent: Feb. 13, 1990

[54] COMMUNICATION METHOD AND EQUIPMENT THEREFOR

[75] Inventor: Koichi Tanaka, Kawasaki, Japan

[73] Assignee: Kabushiki Kaisha Toshiba, Kawasaki, Japan

[21] Appl. No.: 265,294

[22] Filed: Oct. 26, 1988

Related U.S. Application Data

[63] Continuation of Ser. No. 910,637, Sep. 23, 1986, abandoned.

[30] Foreign Application Priority Data

Sep. 27, 1985 [JP] Japan ................................ 60-213812

[51] Int. Cl.$^4$ ............................................. H04J 3/02
[52] U.S. Cl. ................................... 370/85.1; 340/825.5
[58] Field of Search ....................... 370/85, 94, 95, 86, 370/89; 340/825.5

[56] References Cited

U.S. PATENT DOCUMENTS

| | | | |
|---|---|---|---|
| 4,332,027 | 5/1982 | Malcolm et al. | 370/94 |
| 4,412,326 | 10/1983 | Limb | 370/85 |
| 4,539,677 | 9/1985 | Lo | 370/85 |
| 4,560,985 | 12/1985 | Strecker et al. | 340/825.5 |
| 4,689,785 | 8/1987 | Toyonaga et al. | 370/85 |

FOREIGN PATENT DOCUMENTS

| | | |
|---|---|---|
| 0022170 | 1/1981 | European Pat. Off. . |
| WO80/01025 | 5/1980 | PCT Int'l Appl. . |
| WO84/04862 | 12/1984 | PCT Int'l Appl. . |

OTHER PUBLICATIONS

IEEE Standards 802.3-1985, Chap. 4 Media Access Control; Carrier Sense Multiple Access with Collision Detection (CSMA/CD).
The Ethernet, A Local Area Network, Data Linklayer and Physical Layer Specifications; Version 1.0, Sep. 30, 1980; Digital Equipment Corporation; Intel Corporation; Xerox Corporation.
iSBC 186/51 COMMputer Board Hardware Reference Manual, 1984, Intel Corporation.

Primary Examiner—Robert L. Griffin
Assistant Examiner—Wellington Chin
Attorney, Agent, or Firm—Foley & Lardner, Schwartz, Jeffery, Schwaab, Mack, Blumenthal & Evans

[57] ABSTRACT

The present invention relates to a communication method using a small-scale computer network and a communication equipment used therefor. Particularly, a novel communication method in a communication equipment is capable of accumulating a plurality of communication data, i.e., frames at the same time and having a function to sequentially transmit them to the network. According to this method, after transmission of a single frame is completed, when the condition is satisfied that a predetermined time has passed or the condition that the transmission of the frame from any other communication equipment is completed, transmission of the next frame is initiated. Accordingly, this method eliminates the possibility that solely a specified communication station occupies the network, thus making it possible to improve efficiency in use of the network.

7 Claims, 2 Drawing Sheets

COMMUNICATION METHOD AND EQUIPMENT THEREFOR

This application is a continuation of application Ser. No. 910,637, filed Sept. 23,1986, now abandoned.

BACKGROUND OF THE INVENTION

The present invention relates to a communication method using a small scale computer network and a communication equipment used therefor. particularly, the present invention is concerned with a communication method and an equipment therefor capable of accumulating a plurality of communication data (which will be called "frames" hereinafter) at the same time to optionally change the transmission interval between frames when they are transmitted to the network in sequence, thereby eliminating the possibility that only a specified communication station occupies the network.

For one of communication systems to construct LAN (Local Area Network) which is the small scale computer network, there is known CSMA/CD (Carrier Sense Multiple Access with Collision Detection) system. According to this system, a single coaxial cable is used as a transmission medium and all communication equipment are connected in parallel with the medium. A judgement as to whether transmission signals by other communication equipment are present or not on the medium is made. Only when such transmission signals are absent, transmission is enabled, and when it is recognized that other communication equipment except for the self-station or self-equipment effect transmission substantially at the same time, transmission is interrupted to make a judgement for a second time as to whether the above-mentioned transmission signals are present or absent.

There is a tendency that communication equipment for realizing such a communication system is constituted with an LSI dedicated thereto. The feature of such an LSI resides in that the LSI has a function to input a plurality of data related to frames to be transmitted in advance as control data thereby to transmit frames in succession.

However, when the LSI has such a function, the communication equipment operates so as to transmit frames at minimum time intervals. Accordingly, frames will be transmitted one after another on the network medium every minimum interframe time (which will be called "IFS (Interframe Spacing) time" hereinafter).

On the other hand, when there is a frame to be transmitted in other communication equipment on the network, this communication equipment also initiates transmission of the self-frame when the IFS time has elapsed after the frame disappears on the network. In this instance, two communication equipments will effect transmission of frames substantially at the same time. As a result, these frames collide with each other and the contents thereof are broken. Thus, it is necessary to again restart the transmission procedure from the stage of the carrier sense, giving rise to the problem that efficiency in use of the network is extremely low.

SUMMARY OF THE INVENTION

An object of the present invention is to provide a communication equipment having a function to transmit a plurality of frames in succession, the communication equipment being operated to optionally change the time interval from the time when a frame has been transmitted to the time when the next frame is transmitted, thereby to prevent frames transmitted from other communication equipments from being broken thus to prevent efficiency in use of the network from being lowered.

A communication method according to the present invention is characterized in that each communication equipment initiates occurrence of transmission delay instruction after frame transmission is completed, terminates the occurrence of said transmission delay instruction when either the condition that a predetermined time has elapsed from the time when transmission is completed or the condition that reception of any frame from other communication equipment is completed is satisfied, and initiates transmission of the next frame, provided that the occurrence of said transmission delay instruction has been terminated.

A communication equipment according to the present invention comprises a timer section for counting a predetermined time given from the external after transmission of a frame is completed, a carrier sense section for sensing the fact that any frame transmitted from other communication equipment is being received, and a transmission delay flag section for instructing a transmission section which transmits frames to delay transmission of the frame, occurrence of the transmission delay instruction being initiated when transmission of a frame is completed, the transmission delay instruction being terminated in response to either of two facts which has occurred earlier, one fact being that the timer section has counted the predetermined time, the other fact being that reception of any frame transmitted from other communication equipment is detected in the detection section, the transmission section initiating transmission of a frame upon completion that the transmission delay instruction is absent prior to the initiation of transmission.

DETAILED DESCRIPTION OF THE PREFERRED EMBODIMENT

Figure 1:
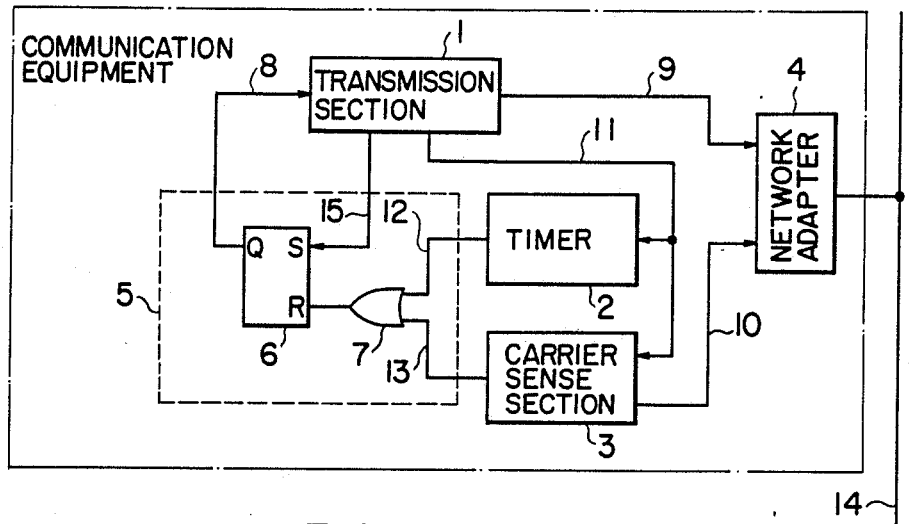
FIG. 1 is a block diagram illustrating a communication equipment according to the present invention.

A preferred embodiment of a communication equipment according to the present invention will be described with reference to FIG. 1.

The communication equipment in this embodiment comprises a transmission section 1 which manages and executes transmission of frames, a timer 2 which counts or measures a predetermined time after transmission of the frame is completed, a carrier sense section 3 which senses the fact that any frame is being transmitted from other communication equipment, a network adapter 4 for transmitting frames from the transmission section 1 to a network medium 14 and for receiving signals from the network medium 14, and a transmission delay flag section 5 responsive to signals from the timer 2 and the carrier sense section 3 to generate a transmission delay signal (which will be simply referred to as "DELAY signal" hereinafter) 8.

In the transmission section 1, when a frame is transmitted, the DELAY signal 8 is checked prior to the transmission. As a result, when the DELAY signal 8 represents logical "0", the transmission section 1 judges this state as the transmission enable state. In addition to this judgement result, when the condition that the IFS time has elapsed (which will be described later) is satisfied, the transmission section 1 initiates transmission of the frame. In contrast, when the DELAY signal 8 represents logical "1", the transmission section 1 prolongs or delays the transmission of the frame until the DELAY signal shifts to logical "0". The transmission section 1 sets a signal 11 indicating that transmission is being effected (which will be simply referred to as "TXON signal" hereinafter) to logical "1" during transmission and sets the TXON signal 11 to logical "0" at a time period during which transmission is not conducted. In addition, the transmission section 1 outputs a pulse of logical "1" on a line for a TXDONE signal 15 when the transmission of the frame is completed. Further, the carrier sense section 3 inputs the TXON signal 11 and a reception data signal 10 and judges that the frame is present on the network medium 14 when the TXON signal 11 represents logical "0" and data appears on the reception data signal 10 to output a carrier sense signal 13. When the TXON signal 11 is input and the logical level of this signal shifts from "1" to "0", i.e., when transmission of the frame is completed, the timer 2 is activated. After a time (which will be called "time $T_1$" hereinafter) set by setting means (not shown) has elapsed, the timer 2 outputs a pulse of logical "1" on a line for a timer signal 12.

The transmission delay flag section 5 is configured so that the TXDONE signal 15, the timer signal 12 and the carrier sense signal 13 are input thereto. The TXDONE signal 15 is connected to a set input of a RS type flip-flop (which will be called a "RS F/F" hereinafter) and the DELAY signal 8 is set to logical "1" when transmission of the frame is completed. In addition, logical sum of the timer signal 12 and the carrier sense signal 13 is performed at an OR circuit 7. The 0R circuit 7 has an output connected to a reset input of the RS F/F 6. Thus, when either of the timer signal 12 and the carrier sense signal 13 represents logical "1", the DELAY signal is cleared to logical "0".

Figure 2:
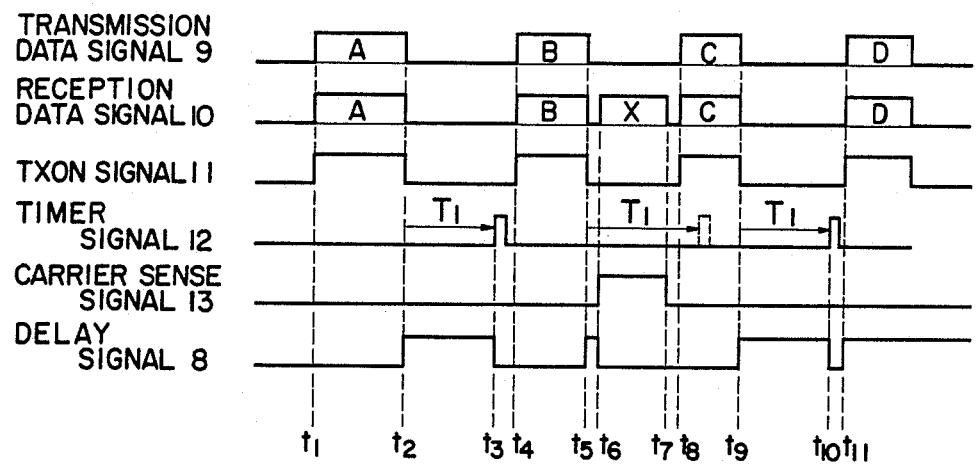
FIG. 2 is a timing chart showing the operation of the communication equipment to which the present invention is applied.

Flow of the entire signals will be described with reference to FIG. 2. It is assumed that the communication equipment successively transmits four frames labeled A, B, C and D.

At time $t_1$, since the DELAY signal 8 represents logical "0", this communication equipment initiates transmission of the first frame A. The frame A being transmitted appears on the reception data signal 10, but the TXON signal represents logical "1", with the result that the carrier sense signal 13 remains at logical "0".

At time $t_2$, since transmission of the frame is completed, a pulse of logical "1" is output on the line for the TXDONE signal 15. Thus, since the DELAY signal 8 shifts to logical "1" and the TXON signal 11 shifts to logical "0", the timer is activated. Since the DELAY signal 8 has shifted to logical "1", it is unable to transmit the next frame B.

At time $t_3$, since the time $T_1$ has elapsed after the transmission of the frame A is completed, a pulse of logical "1" is output on the line for the timer signal 12 and the DELAY signal 8 shifts to logical "0".

At time $t_4$, since the DELAY signal 8 represents logical "0" and the IFS time has passed from the time when the transmission of the frame A is completed, transmission of the next frame B is initiated. The operation at this time is the same as that at time $t_1$.

At time $t_5$, since the transmission of the frame B is completed, the timer 2 is activated.

At time $t_6$, reception of a frame X transmitted from any other communication equipment is initiated. At this time, since the TXON signal 11 represents logical "0", the carrier sense signal 13 shifts to logical "1". In response to the rise of the carrier detection signal 13, the DELAY signal 8 immediately shifts to logical "0".

At time $t_7$, reception of the frame X is thus completed. At this time, since the DELAY signal 8 represents logical "0", transmission of the third frame C can be initiated at time $t_8$ when IFS time has passed after the reception of the frame X.

The operation at times $t_9$ to $t_{11}$ is the same as that at times $t_2$ to $t_4$.

At this time, even when the length of the frame X is shorter than the time $T_1$, since the DELAY signal 8 is maintained at logical "0" at time $t_6$ when reception of the frame X is initiated, it is possible to transmit the frame C after the transmission of the frame B is completed before the time $T_1$ has passed. In this instance, since the TXON signal represents logical "1" before counting of the timer 2 is completed, the timer signal 12 to be output between times $t_8$ and $t_9$ is not actually output.

Then, the value of the time $T_1$ to be set will be described.

Figure 3:
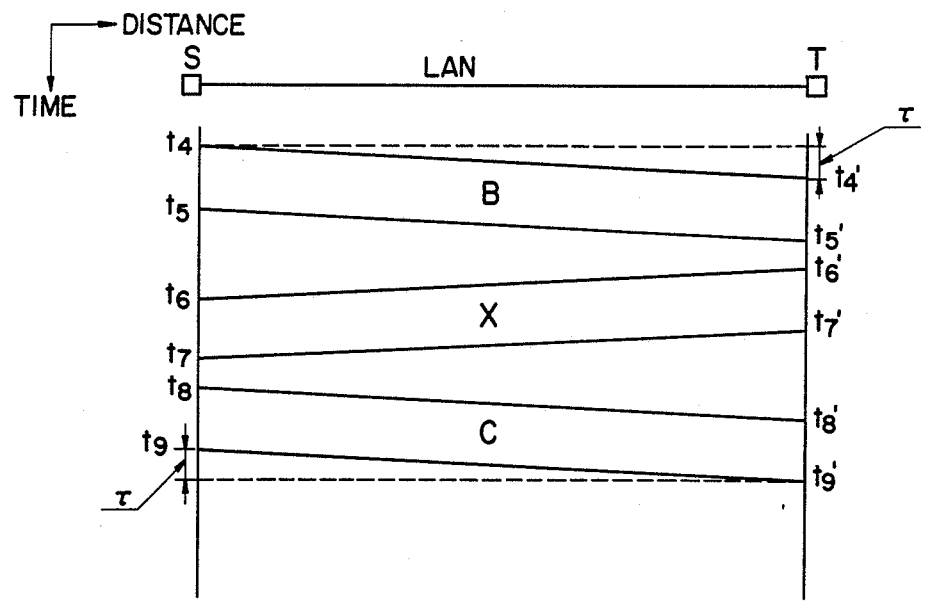
FIG. 3 is an explanatory view showing propagation of a frame on the network employed in the communication equipment invention.

FIG. 3 shows the relationship between propagation time of a signal in the LAN and distance between communication equipment where abscissa and ordinate represent distance and time elapsed, respectively. It is assumed that communication equipment S and T are most distant from each other in this LAN and symbols $t_4$ to $t_9$ and $t_4'$ to $t_9'$ representative of times correspond to those $t_4$ to $t_9$ in FIG. 2, respectively.

First, at time $t_4$, frame B (corresponding to the frame B in FIG. 2) transmitted from the communication equipment S is propagated at a finite speed within the network medium and is received at the communication equipment T at time $t_4'$. This time $(t_1'-t_4)$ is referred to as the maximum propagation delay time $\tau$. Accordingly, the time $t_5'$ when the communication equipment T detects that transmission of the frame B has been completed at the communication equipment S (at time $t_5$) is represented by $(T_5+\tau)$.

In the communication equipment T, transmission of the frame X is initiated at time $t_6$, when IFS time has passed and this frame X is received at time $t_6$ when time $\tau$ has passed at the communication equipment S.

From the above, the following relationships will be derived.

$$t_5' = t_5 + \tau$$

$$t_6' = t_5' + IFS = t_5 + \tau + IFS, \text{ and}$$

$$t_6 = t_6' + \tau = t_5 + 2\tau + IFS.$$

Namely, this means that the communication equipments are unable to receive the frame transmitted from the most distant communication equipment as long as time $(2\tau + IFS)$ has not passed after the communication equipment S has transmitted a frame.

Accordingly, for time $T_1$ required for normally receiving this frame X, it is necessary to satisfy $T_1 > (2\tau + IFS)$.

Further, by setting the time $T_1$ to values different from each other, it is possible to change order of priority related to use of the network by each communication equipment. Generally, the longer the time $T_1$ is, the more order of priority lowers.

The communication system according to the present invention is configured above, with the result that the next frame cannot be transmitted within the time $T_l$, for example, after the self-frame has been transmitted at the communication equipment S. For instance, the frame B cannot be transmitted immediately after the frame A in FIG. 2. Accordingly, when a frame transmitted immediately from any other communication equipment T upon completion of the frame transmission is reached to the communication equipment within the time $T_1$, the frame from the communication equipment T has priority to frames from the communication equipment S, resulting in no possibility that this frame is broken by the frame to be transmitted from the communication equipment S next time. For instance, in FIG. 2, the frame X from the communication equipment T will be normally transmitted subsequently to the frame B.

In the conventional example, when the frame B has been transmitted at the communication equipment S, the frame C is transmitted with a delay of IFS time and the frame X is transmitted also from the communication equipment T substantially at the same time. As a result, these two frames collide with each other, so that both frames are broken. For this reason, post processing time for collision has been required. In contrast, the present invention can avoid collision and wasteful time is not required. Further, with the present invention, there is no possibility that the network medium is wastefully used due to occurrence of collision, thus making it possible to effect data communication having high efficiency.

In addition, after a frame from any other communication equipment has been received, the frame received can be immediately transmitted after the IFS time has passed. Thus, the present invention can advantageously realize data communication having a still more higher efficiency.

What is claimed is:

1. A communication method using LAN of a CSMA/CD system, wherien each communication equipment initiates a transmission delay instruction after transmission of a frame is completed, terminates said transmission delay instruction when either the condition that a first predetermined time has passed from the time when said transmission of the frame is completed or the condition that a second predetermined time has passed from the time when reception from any other communication equipment is completed, and initiates transmission of the next frame, provided that said transmission delay instruction has been terminated, wherein the first and second predetermined times have such a relationship that said second predetermined time is less than $2\tau$ which is less than or equal to the first predetermined time, where $\tau$ is a time required until a signal is propagated to another communication equipment located at a furthermost position.

2. A communication method as set forth in claim 1, wherien said first predetermined time is set on the basis of propagation time of a signal in said LAN and said second predetermined time is set as IFS being a minimum inter frame time to be set when two frames are transmitted.

3. A communication method as set forth in claim 2, wherein said first predetermined time is set so that $T > (2\tau + IFS)$, where T denotes said first predetermined time.

4. A communication method as set forth in claim 3, wherein the commuication equipment is such that as an order of priority of use lowers, said predetermined time is increased.

5. A communication equipment constituting LAN of the CSMA/CD system, said communication equipment comprising a timer section for counting a predetermined time, a carrier sense section for sensing that a frame transmitted from any other communication equipment is being received, a transmission section for controlling the frame transmission, and a transmission delay section for instructing said transmission section to delay transmission of the frame, the occurrence of said transmission delay instruction being initiated when transmission of a frame is completed, said transmission delay instruction being terminated in response to either of two facts which has occurred earlier, one fact being that said timer section has counted said predetermined time, the other fact being that said carrier sense section has output a sense signal, the frame transmission being initiated only when a predetermined time as a minimum interframe time has passed and said transmission delay instruction is terminated.

6. A communication equipment as set forth in claim 5, wherein said predetermined time is greater than a value obtained by adding to said minimum interframe time a time twice as large as a time required when a signal is propagated between the most distant communication equipments on the network.

7. A communication equipment as set forth in claim 5, wherein said transmission delay section comprises a logical sum circuit which inputs a signal occurring when said timer section has counted said predetermined time and a signal occurring when said carrier sense section senses that the frame transmitted from any other communication equipment is being received, and a flip-flop which is set at the time when transmission of each frame by said transmission section is completed and is reset in response to an output from said logical sum circuit.

* * * * *